US008347593B2

(12) United States Patent
Ito et al.

(10) Patent No.: US 8,347,593 B2
(45) Date of Patent: Jan. 8, 2013

(54) PUSH MOWER (75) Inventors: Ryosuke Ito, Anjo (JP); Yasuo Ifuku, Anjo (JP)

(73) Assignee: Makita Corporation, Anjo (JP)

(*) Notice: Subject to any disclaimer, the term of this patent is extended or adjusted under 35 U.S.C. 154(b) by 0 days.

(21) Appl. No.: 13/154,950

(22) Filed: Jun. 7, 2011

(65) Prior Publication Data
US 2011/0308219 A1 Dec. 22, 2011

(30) Foreign Application Priority Data
Jun. 17, 2010 (JP) ................................ 2010-138083

(51) Int. Cl.
*A01D 34/00* (2006.01)
(52) U.S. Cl. ....................................................... 56/17.2
(58) Field of Classification Search .................. 56/17.1, 56/17.2, 255, 320.1
See application file for complete search history.

(56) References Cited

U.S. PATENT DOCUMENTS

| | | | | | |
|---|---|---|---|---|---|
| 2,848,859 | A | * | 8/1958 | Abel | 56/17.2 |
| 3,357,715 | A | * | 12/1967 | Plamper et al. | 280/43.13 |
| 3,677,574 | A | | 7/1972 | Cyr | |
| 4,167,093 | A | | 9/1979 | Pfeiffer et al. | |
| 4,321,784 | A | * | 3/1982 | Wood et al. | 56/17.2 |
| 4,785,612 | A | * | 11/1988 | Morishita et al. | 56/17.2 |
| 4,905,463 | A | * | 3/1990 | Eilles | 56/17.2 |
| 5,230,208 | A | * | 7/1993 | Hess et al. | 56/17.2 |
| 5,259,175 | A | * | 11/1993 | Schmidt | 56/17.2 |
| 5,526,633 | A | * | 6/1996 | Strong et al. | 56/17.2 |

FOREIGN PATENT DOCUMENTS

| | | |
|---|---|---|
| DE | 20 2008 002 831 U1 | 6/2008 |
| EP | 0 766 911 A1 | 4/1997 |
| EP | 1 637 023 A2 | 3/2006 |
| JP | Y2-2531754 | 4/1997 |
| JP | A-11-103634 | 4/1999 |

OTHER PUBLICATIONS

European Search Report issued in Application No. 11 16 8920; Dated Sep. 23, 2011.
Aug. 9, 2012 Office Action issued in European Patent Application No. 11 168 920.4.

* cited by examiner

*Primary Examiner* — Thomas B Will
*Assistant Examiner* — Joan D Misa
(74) *Attorney, Agent, or Firm* — Oliff & Berridge, PLC (57) ABSTRACT

A push mower having a height adjustment lever, which can be manipulated easily, is provided. The provided push mower includes: a main body configured to move along a ground; a blade attached to the main body; a height adjustment lever attached to the main body; and a height adjustment mechanism configured to change a height of the blade from the ground based on a position of the height adjustment lever. The height adjustment lever includes: a pillar protruding from the main body; a grip fixed to the pillar; and a lock member attached to the grip and configured to move with respect to the grip between a lock position and an unlock position. A movement of the height adjustment lever is inhibited when the lock member is at the lock position, and the movement of the height adjustment lever is allowed when the lock member is at the unlock position.

7 Claims, 7 Drawing Sheets

PUSH MOWER

CROSS-REFERENCE TO RELATED APPLICATION

This application claims priority to Japanese Patent Application No. 2010-138083 filed on Jun. 17, 2010, the contents of which are hereby incorporated by reference into the present application.

FIELD

The present Application relates to a push mower.

DESCRIPTION OF RELATED ART

Japanese Patent Application Publication No. 11-103634 discloses a push mower in which a cutting height can be adjusted. This push mower has a main body which moves along a ground, a blade attached to the main body, and a height adjustment lever. The height adjustment lever can move with respect to the main body. Furthermore, the height adjustment lever has a pillar and a grip fixed to the pillar. The grip is gripped by a user when manipulating the height adjustment lever. The grip is able to rotate about the pillar. When the grip is rotated in one direction, the height adjustment lever is locked with respect to the main body. When the grip is rotated in the opposite direction, the height adjustment lever is unlocked.

When adjusting the cutting height of the push mower, the user rotates the grip in the one direction to unlock the height adjustment lever. Consequently, the entirety of the height adjustment lever becomes movable with respect to the main body. The user then grips the grip and moves the entirety of the height adjustment lever with respect to the main body. In so doing, a height of the blade from the ground changes based on the movement of the height adjustment lever. In other words, the cutting height changes. When the height adjustment lever has been moved to a position where a desired cutting height is obtained, the user rotates the grip in the opposite direction and locks the height adjustment lever. In accordance with this, the cutting height is fixed.

BRIEF SUMMARY

As described above, when adjusting the cutting height by the height adjustment lever in the push mower of Japanese Patent Application Publication No. 11-103634, the user needs to perform an operation of rotating the grip (in other words, a switching of the lock) and an operation of gripping the grip and moving the entirety of height adjustment lever (in other words, a change of the cutting height). By composing the height adjustment lever in such a manner that the switching of the lock and the change of the cutting height are performed depending on the direction of movement of the grip, then the user must move the grip in a complex fashion when adjusting the cutting height. Therefore, user cannot manipulate the height adjustment lever smoothly. In other words, a conventional push mower has a problem in that height adjustment has poor operability. Consequently, the present specification provides a push mower having a height adjustment lever that is easier to manipulate.

A push mower disclosed in this specification comprises a main body, a blade, a height adjustment lever, and a height adjustment mechanism. The main body is configured to move along a ground. The blade is attached to the main body. The height adjustment lever is attached to the main body. The height adjustment mechanism is configured to change a height of the blade above the ground based on a position of the height adjustment lever. The height adjustment lever comprises a pillar protruding from the main body, a grip fixed to the pillar, and a lock member attached to the grip and configured to move with respect to the grip between a lock position and an unlock position. A movement of the height adjustment lever is inhibited when the lock member is at the lock position, and the movement of the height adjustment lever is allowed when the lock member is at the unlock position.

When adjusting the cutting height in this push mower, the user firstly grips the grip of the height adjustment lever and moves the lock member to the unlock position by manipulating the lock member with a finger. Thereupon, the user changes the height of the blade (in other words, the cutting height) by gripping the grip and manipulating the height adjustment lever. When the height adjustment lever has been moved to a position where a desired cutting height is obtained, the user moves the lock member to the lock position and fixes the cutting height. Consequently, in this push mower, since the lock member which is separated from the grip is attached on the grip, then the user is able to manipulate the lock member with a finger while gripping the grip. More specifically, there is no need to move the grip itself for the purpose of unlocking. Since there is no need to move the grip for the purpose of unlocking, then the height adjustment lever has good operability.

DETAILED DESCRIPTION OF THE PREFERRED EMBODIMENT

In an embodiment, a lock member may preferably comprise a base portion supported by a grip, and an extending portion extending from the base portion. An engaging part of the extending portion may engage with a main body when the lock member is at a lock position.

In the embodiment described above, the base portion may be within the grip. The extending portion may extend from the base portion to an outside of the grip into the main body.

In the embodiments described above, an end part of the extending portion, which is at an end side of the extending portion from the engaging part, may be supported by a pillar when a height adjustment lever is manipulated in a state which the lock member is at the lock position. In this configuration, when the lock member is in the lock position, the movement of the height adjustment lever is inhibited due to the engaging part of the extending portion engaging with the main body. Therefore, if a user attempts to move the height adjustment lever forcibly when the lock member is in the lock position, a strong force is applied to the extending portion. However, the end part of the extending portion, which is at the end side from the engaging part is supported by the pillar of the height adjustment lever when the height adjustment lever is manipulated while the lock member is in the lock position. Furthermore, a base side of the extending portion is connected to the base portion. In other words, the end side and the base side of the extending portion are supported by the base portion and the pillar. Therefore, the extending portion has high strength.

In the embodiments of which the lock member comprises the base portion and the extending portion, the push mower can be configured as follows. That is, a hole may be formed on the pillar. The end part of the extending portion, which is at the end side of the extending portion from the engaging part, is in the hole when the lock member is at the lock position. The hole may open to a direction perpendicular to a direction of the movement of the height adjustment lever. In this configuration, if force is applied to the extending portion when the lock member is in the lock position, then the end part of the extending portion is supported by the inner surface of the hole on the pillar. In other words, the extending portion is supported at either end. By this configuration, it is possible to improve the strength of the extending portion.

In the embodiment of which the hole is formed on the pillar, the hole may open to a direction perpendicular to a direction of the movement of the height adjustment lever.

In the embodiments described above, the push mower may preferably further comprise a spring biasing the lock member to the lock position. The lock member may comprise a button portion configured to protrude from the grip when the lock member is at the lock position. The lock member may move to the unlock position when the button portion is pushed. In this configuration, if the user pushes the button portion, the height adjustment lever is unlocked. Furthermore, if the user releases the button portion, the lock member is moved to the lock position by the spring and the height adjustment lever is locked. Due to this, it is possible to switch locking easily by manipulating the button portion.

In the embodiments described above, a rail section or groove section which guides a lock member slidably may preferably be formed in a grip of a height adjustment lever.

Figure 1:
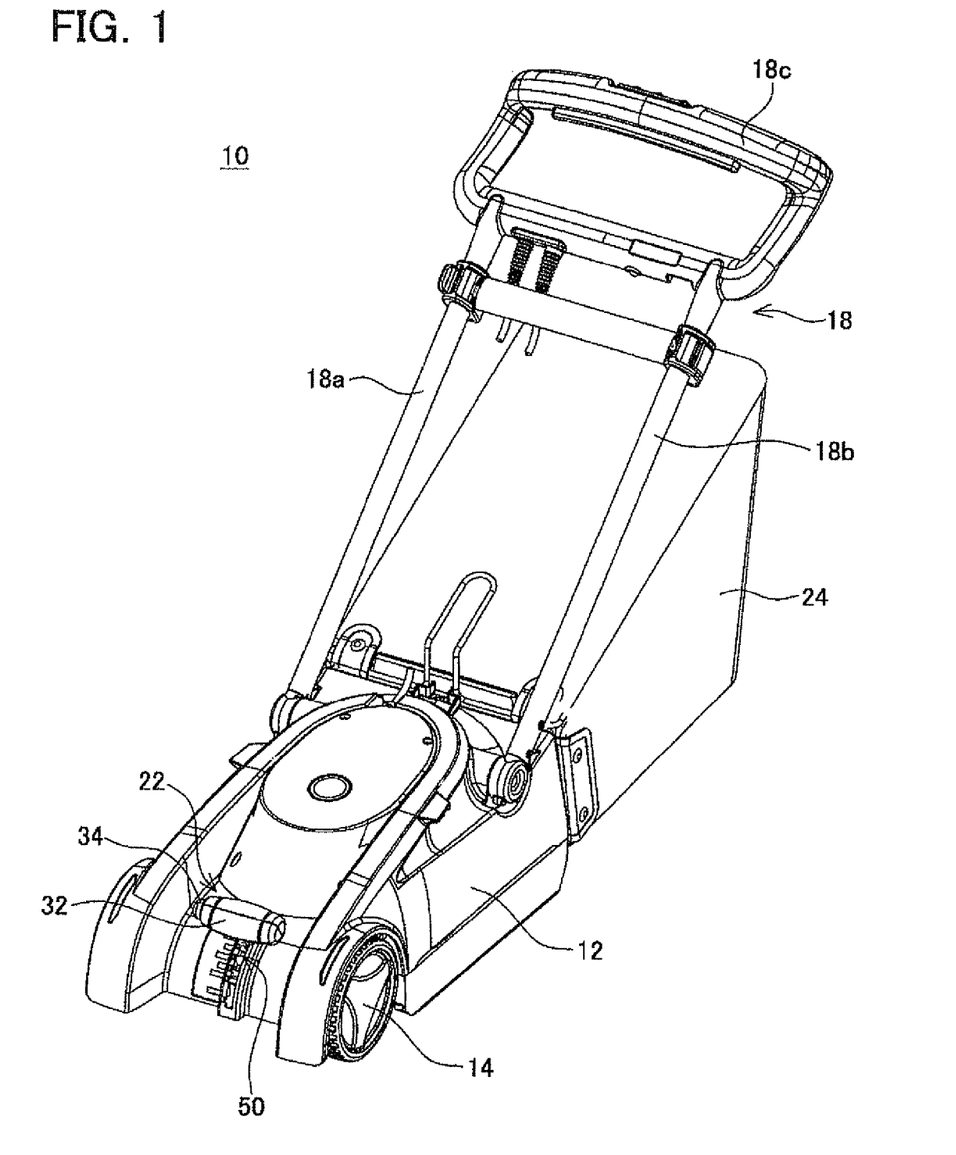
FIG. 1 is a perspective diagram of a push mower 10.
Figure 2:
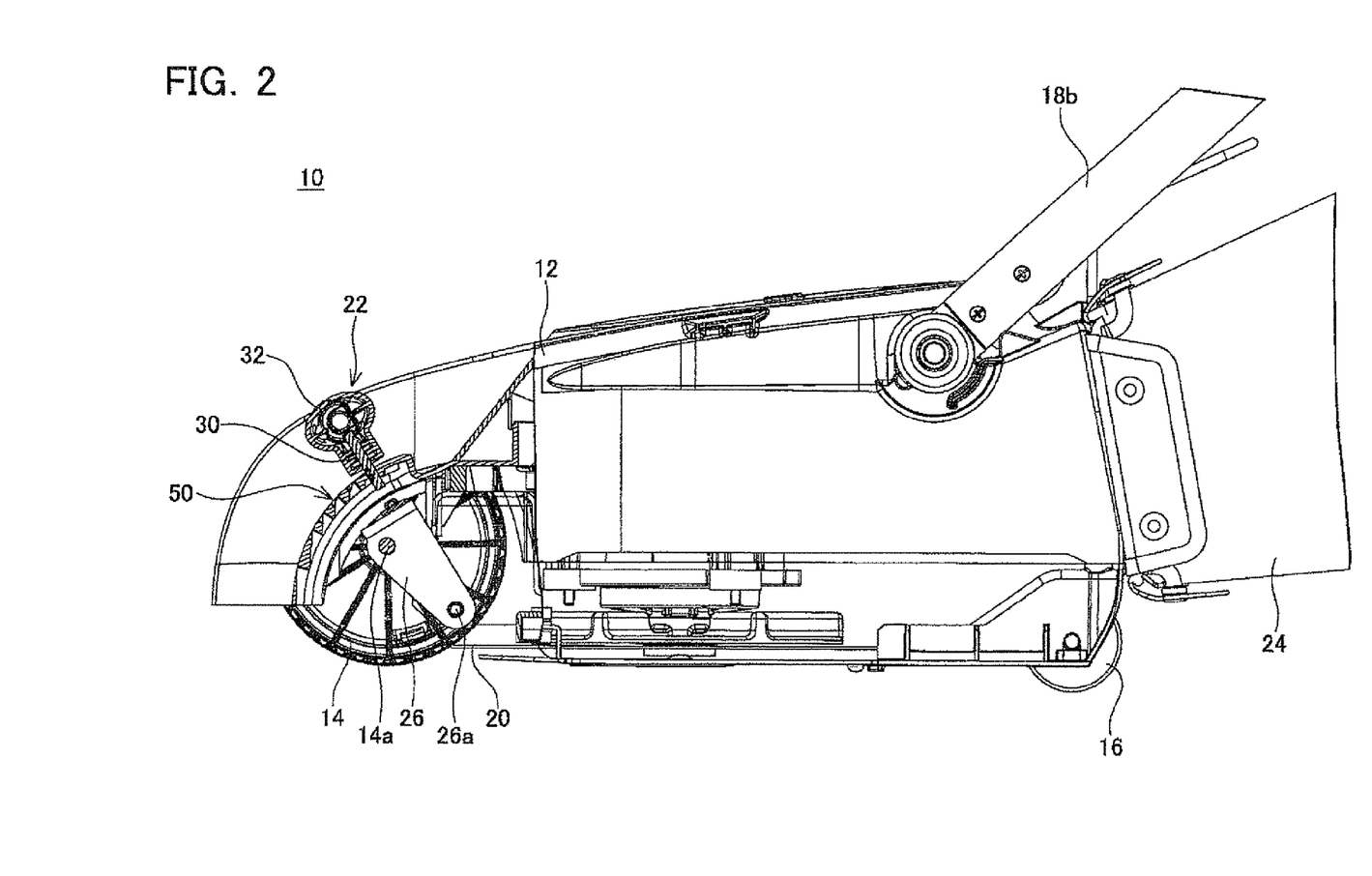
FIG. 2 is a vertical cross-sectional diagram of a push mower 10 set to a low cutting height.

A push mower according to another embodiment is now described. As shown in FIGS. 1 and 2, a push mower 10 (or a walk-behind mower) according to the embodiment comprises a body 12, a pair of front wheels 14, a rear wheel 16, a handle 18, a blade 20, a height adjustment lever 22, and a grass catcher 24.

Figure 3:
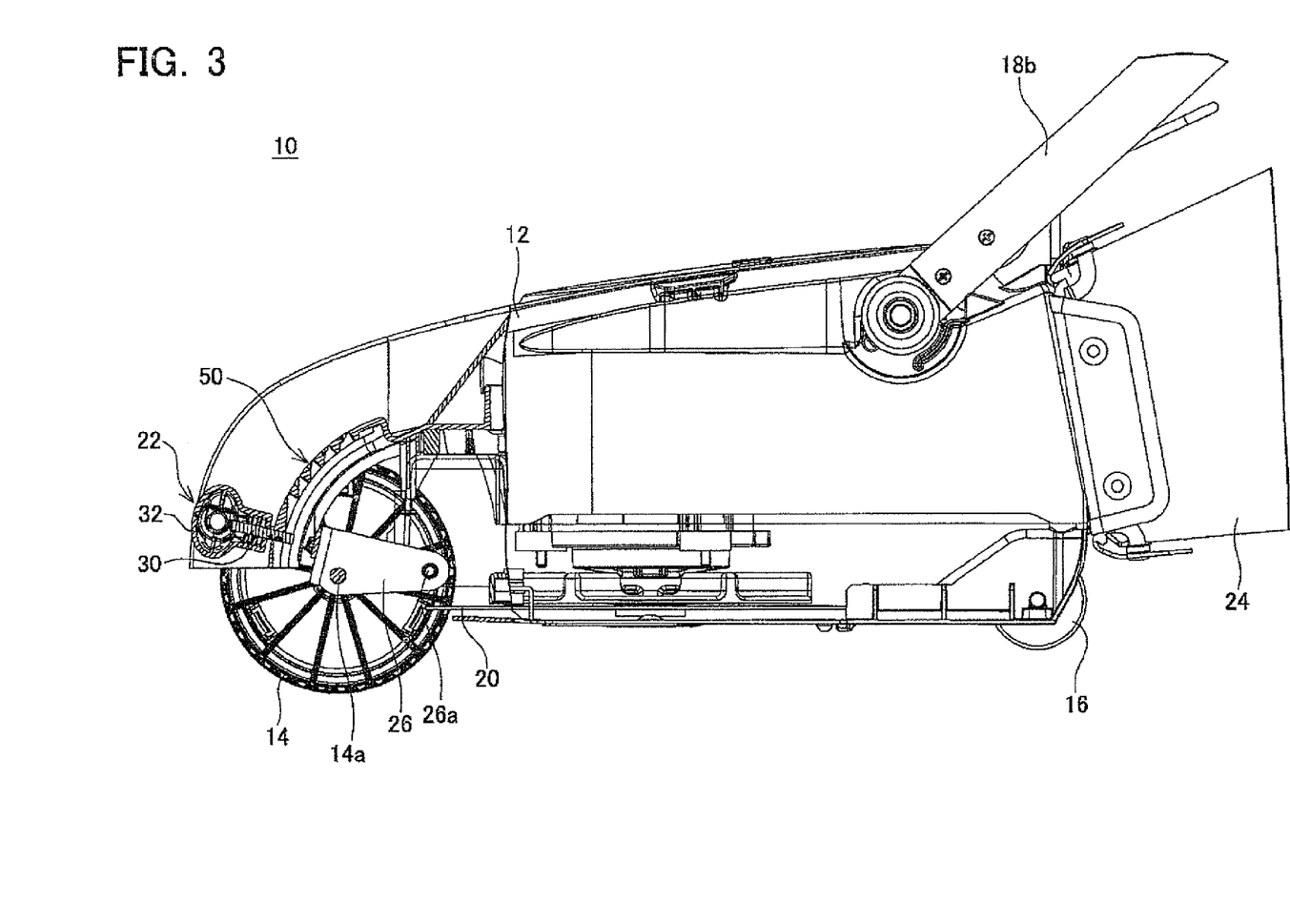
FIG. 3 is a vertical cross-sectional diagram of a push mower 10 set to a high cutting height.

The pair of front wheels 14 is respectively disposed on the left and right-hand sides of a front part of the body 12. The pair of front wheels 14 is connected to the body 12 via a swing frame 26 which is shown in FIG. 2. The front wheels 14 are attached to the swing frame 26 by a rotating axle 14a and are able to rotate about the rotating axle 14a. The swing frame 26 is attached to the body 12 by a swing axle 26a parallel to the rotating axle 14a, and is able to swing with respect to the body 12 about the swing axle 26a. The swing frame 26 is able to swing between the position shown in FIG. 2 and the position shown in FIG. 3. As shown in FIGS. 2 and 3, the position of the front wheels 14 with respect to the body 12 in the height direction is changed by swing of the swing frame 26. More specifically, when the swing frame 26 swings, the interval between the ground and the bottom part of the body 12 changes.

The rear wheel 16 is installed rotatably on a lower rear part of the body 12.

The blade 20 is attached to a lower part of the body 12. The blade 20 is disposed in a position facing the ground. The blade 20 rotates about an axis substantially perpendicular to the ground. The blade 20 is rotated by a motor (not illustrated) provided inside the body 12. When the swing frame 26 swings as described above, the interval between the ground and the blade 20 changes. Consequently, the height at which the blade 20 cuts grass (in other words, the cutting height) changes.

The handle 18 has a pair of shafts 18a and 18b, and grip 18c. The shafts 18a and 18b extend inclinedly rearwards and upwards from a side face of the body 12. The grip 18c is connected to end parts of the shafts 18a and 18b.

The grass catcher 24 is connected to a rear part of the body 12. The grass catcher 24 collects and holds cut grass.

The height adjustment lever 22 has a grip 32, a shaft 30 extending from the grip 32, and a lock member 34 attached to the grip 32. The shaft 30 is fixed to the swing frame 26. The shaft 30 protrudes to the outside of the body 12 via a slit hole 50 formed on a front part of the body 12. The grip 32 is fixed to the shaft 30 on the outer side of the body 12, By manipulating the height adjustment lever 22, it is possible to swing the swing frame 26 between the position shown in FIG. 2 and the position shown in FIG. 3. More specifically, it is possible to adjust the grass cutting height by manipulating the height adjustment lever 22.

When the push mower 10 is used, the blade 20 is rotated by driving a motor. As the user walks while pushing the push mower 10, the blade 20 strikes grass and cuts the grass. The cut grass is conveyed to the grass catcher 24.

Figure 4:
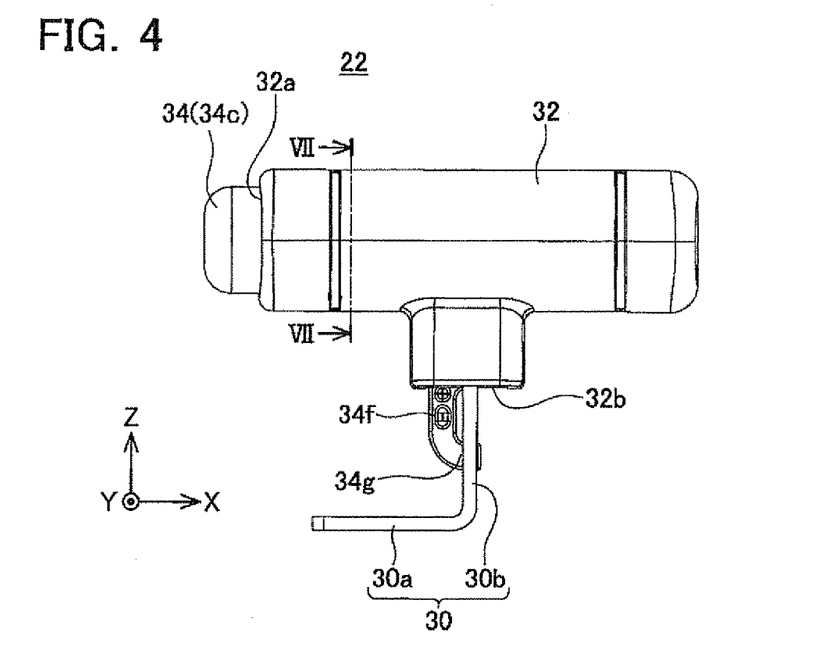
FIG. 4 is a front face diagram of a height adjustment lever 22.
Figure 5:
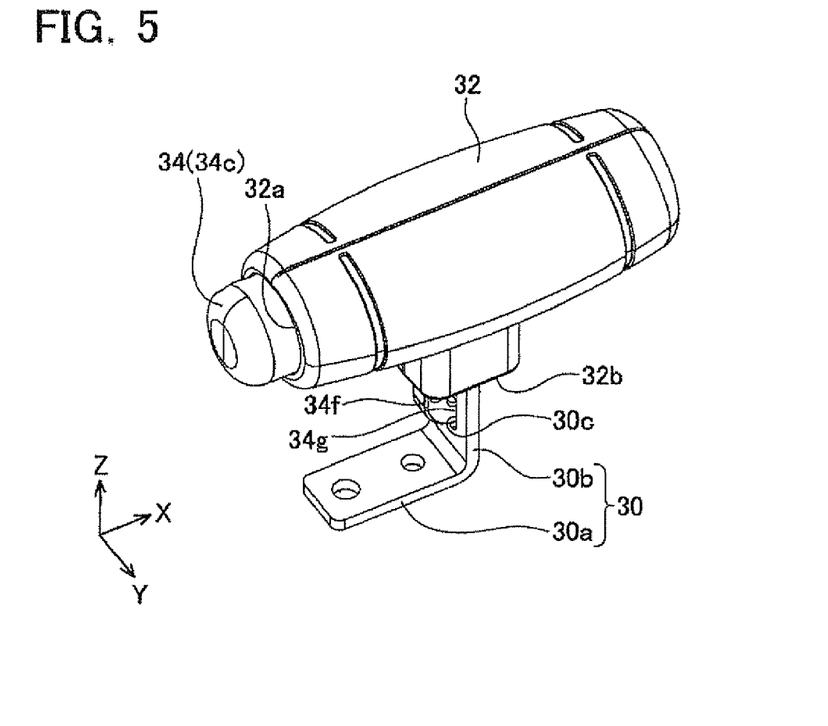
FIG. 5 is a perspective diagram of the height adjustment lever 22.
Figure 6:
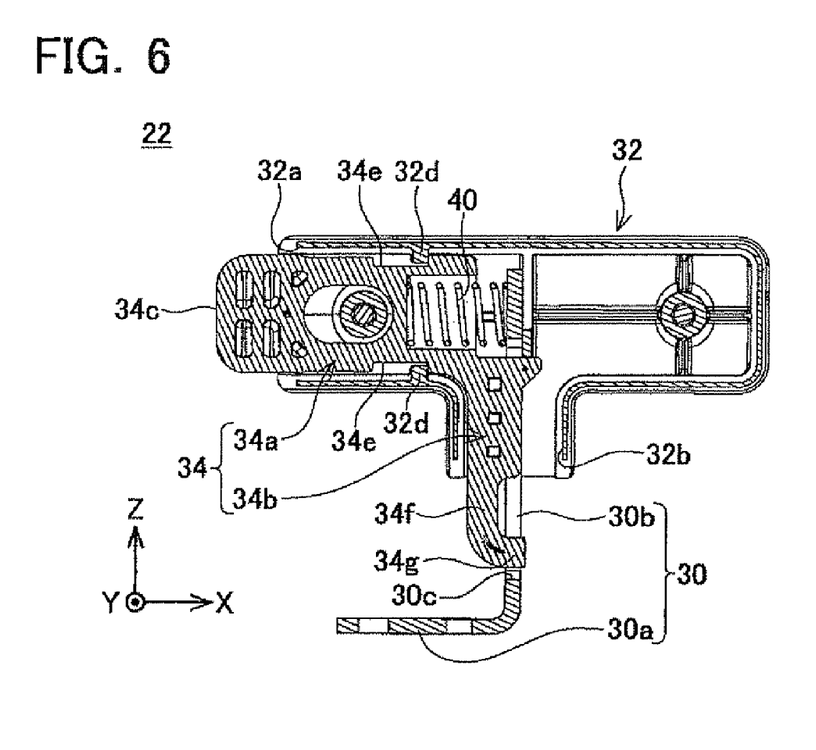
FIG. 6 is a vertical cross-sectional diagram of the height adjustment lever 22.

Next, a structure of the height adjustment lever 22 will be described in detail. As shown in FIGS. 4 to 6, the shaft 30 is constituted by an L-shaped bracket which is formed by bending a metal plate in its thickness direction at a substantially right angle. Below, a direction in which a short edge portion 30a of the shaft 30 extends is the X direction, a direction in which a long edge portion 30b of the shaft 30 extends is the Z direction, and a direction perpendicular to the X direction and the Z direction is the Y direction. The short edge portion 30a of the shaft 30 is screw fastened to the swing frame 26. The long edge portion 30b of the shaft 30 passes through the slit hole 50 in the body 12 and extends to the outside of the body 12. A through hole 30c is formed in the long edge portion 30b. The through hole 30c opens to a direction perpendicular to the direction of movement of the height adjustment lever 22.

The grip 32 is fixed to an end of the long edge portion 30b of the shaft 30. The grip 32 has the shape of an elliptical column with curved side faces and extends in the X direction. An opening 32a is formed in one end face of the grip 32. Furthermore, an opening 32b is formed in a lower part of the approximate center of the grip 32. A space which connects the opening 32a to the opening 32b is formed inside the grip 32.

As shown in FIG. 6, a major part of the lock member 34 is accommodated in the space inside the grip 32. The lock member 34 has a base portion 34a which extends toward the opening 32a from the approximate center of the grip 32, and an extending portion 34b which extends downwards from the base portion 34a.

One end part of the base portion 34a protrudes to the outside of the grip 32 from the opening 32a. A push button 34c is formed by the portion which protrudes from the opening 32a.

Figure 7:
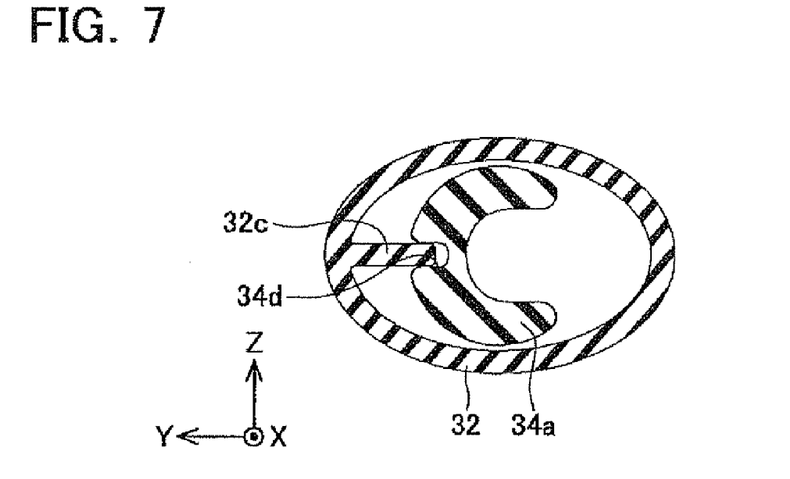
FIG. 7 is a cross-sectional diagram along line VII-VII in FIG. 4.

FIG. 7 shows a cross-sectional diagram along VII-VII line in FIG. 4. As shown in FIG. 7, a groove 34d is formed in an outer circumferential surface of the base portion 34a. Furthermore, a protruding rail 32c is formed on an inner surface of the grip 32. The groove 34d and the rail 32c extend in the X direction. The groove 34d engages with the rail 32c. The lock member 34 is able to slide in the X direction with respect to the grip 32, due the groove 34d being guided by the rail 32c. In other words, the lock member 34 is supported slidably by the grip 32.

As shown in FIG. 6, grooves 34e extending in the X direction are formed in an upper part and a lower part of the base portion 34a. Convex portions 32d are formed in an upper part and a lower part of an inner surface of the grip 32. The convex portions 32d are inserted respectively into the corresponding grooves 34e. A spring 40 is disposed beside the base portion 34a. One end of the spring 40 is in contact with the base portion 34a, and the other end of the spring 40 is in contact with a wall face formed in the approximate center of the grip 32. The spring 40 biases the lock member 34 toward the opening 32a. By the spring 40, the lock member 34 is located in a position where the respective convex portions 32d are in contact with end parts of the grooves 34e. If the user pushes the push button 34c, the spring 40 is compressed and the lock member 34 moves in the X direction (the rightward direction in FIG. 6). When the user releases the push button 34c, the spring 40 extends and the lock member 34 returns to a position shown in FIG. 6.

Figure 8:
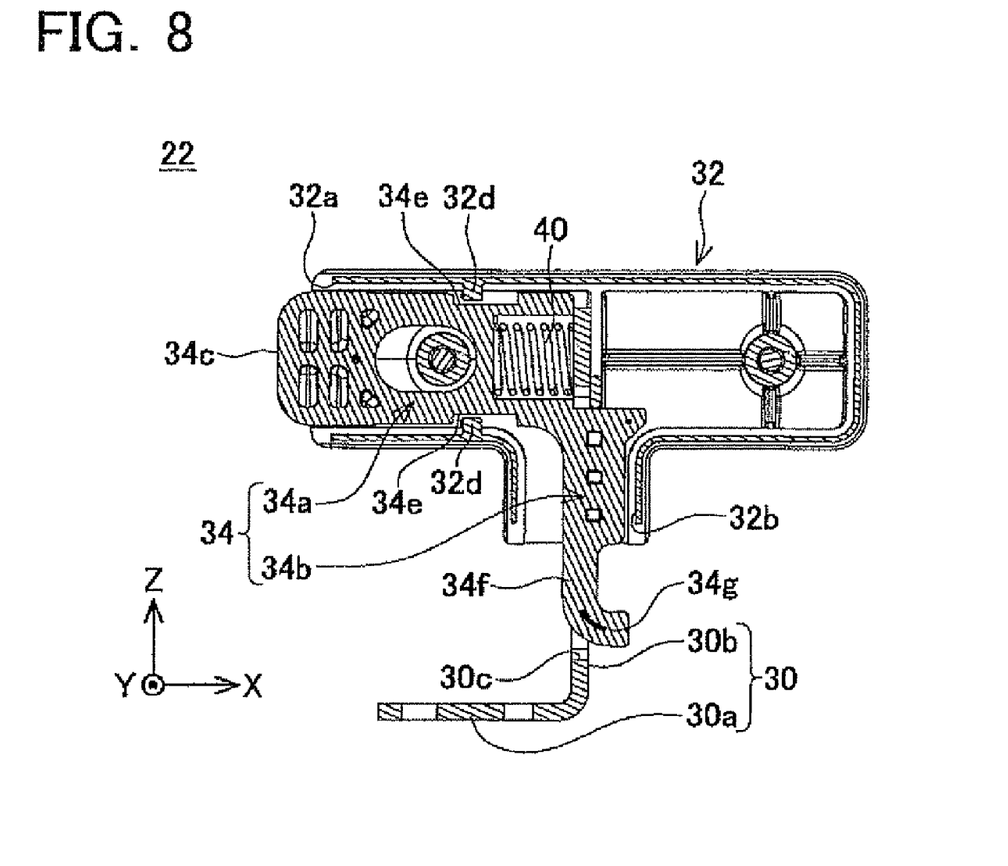
FIG. 8 is a vertical cross-sectional diagram of the height adjustment lever 22 in a state where a push button 34c is pushed.

The extending portion 34b has a first part 34f which extends along the long edge portion 30b from the base portion 34a and a second part 34g which bends from the first part 34f and extends towards the long edge portion 30b. In a state where the push button 34c is not being pushed as shown in FIG. 6, the second part 34g is located inside the through hole 30c of the shaft 30. When the push button 34c is pushed, the entirety of the first part 34f moves inside the hole as shown in FIG. 8.

As shown in FIGS. 1 and 2, the height adjustment lever 22 is installed in a manner that the grip 32 extends in a left/right direction and the push button 34c is positioned on a left-hand side when the push mower 10 is viewed from the front side.

Figure 9:
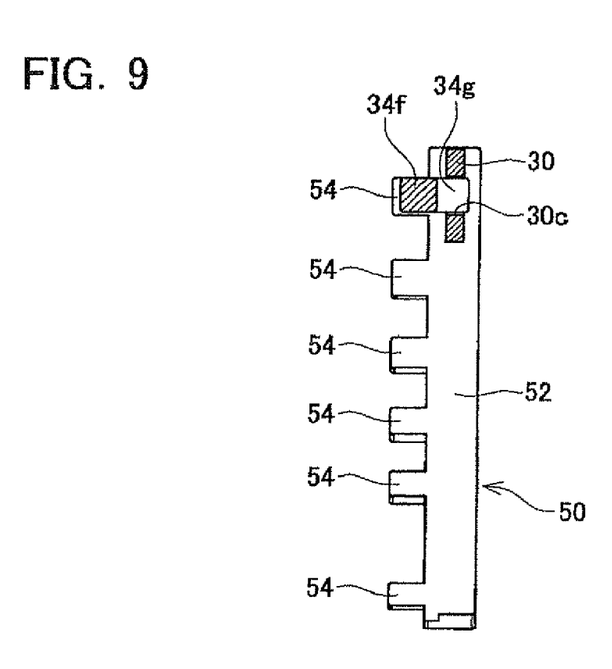
FIG. 9 is a plan diagram of a slit hole 50 in a state where the push button 34c is not pushed.
Figure 10:
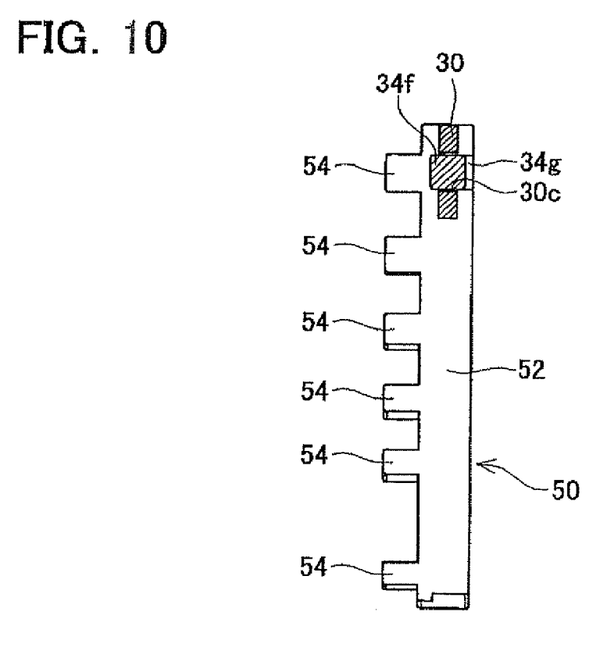
FIG. 10 is a plan diagram of the slit hole 50 in a state where the push button 34c is pushed.

FIG. 9 shows a slit hole 50 formed in the front part of the body 12. As stated above, the shaft 30 of the height adjustment lever 22 is inserted into the slit hole 50. As shown in FIG. 9, the slit hole 50 has a slit portion 52 extending in a straight line and a plurality of cutaway portions 54 extending in a horizontal direction from the slit portion 52, The shaft 30 is positioned inside the slit portion 52. When the push button 34c is not pushed, the first part 34f of the lock member 34 is positioned inside a cutaway section 54. When the push button 34c is pushed, the first part 34f moves inside the through hole 30c of the shaft 30 (in other words, inside the slit portion 52), as shown in FIG. 10.

Next, the method of adjusting the cutting height will be described. When the push button 34c is not pushed, as shown in FIG. 9, the first part 34f of the lock member 34 is positioned inside a cutaway section 54. Since the first part 34f is engaged with a cutaway section 54, the shaft 30 cannot move inside the slit portion 52. In other words, movement of the height adjustment lever 22 is inhibited by the first part 34f engaging with the cutaway section 54.

When adjusting the cutting height, the user grips the grip 32 of the height adjustment lever 22. The user then pushes the push button 34c with a finger of the hand gripping the grip 32. In so doing, the lock member 34 slides and, as shown in FIG. 10, the first part 34f moves inside the slit portion 52 from the cutaway section 54 (in other words, inside the through hole 30c of the shaft 30). By this means, the shaft 30 becomes movable along the slit portion 52. In other words, the height adjustment lever 22 becomes movable along the slit portion 52. Next, the user moves the height adjustment lever 22 along the slit portion 52. Consequently, the swing frame 26 swings and the height of the blade 20 from the ground (in other words, the cutting height) changes. When the user moves the height adjustment lever 22 to a position where the desired cutting height is obtained, the user then releases the push button 34c. In so doing, the first part 34f of the lock member 34 engages with the corresponding cutaway portion 54. Due to this, the movement of the height adjustment lever 22 is inhibited and the height of the blade 20 is fixed. By the procedure described above, the user is able to adjust the cutting height.

As described above, in the push mower 10, the height adjustment lever 22 has a lock member 34 which is separate from the grip 32 and moves relative to the grip 32. Therefore, the user is able to unlock the height adjustment lever 22 by manipulating the lock member 34 (in other words, the push button 34c) with a finger of the hand gripping the grip 32. Since the operating section for unlocking the height adjustment lever 22 (in other words, the push button 34c) and the manipulating section for moving the entirety of height adjustment lever 22 (in other words, the grip 32) are provided separately, then there is no need to perform a complicated movement of the grip 32 itself. The user is able to change the cutting height simply by moving the grip 32 in a straight line along the slit portion 52, while pushing the push button 34c. Consequently, the push mower 10 has good operability for changing the cutting height.

Furthermore, in a composition just like a conventional technique where the grip is moved relative to the main body in order to release the lock, the user must support the main body in order to prevent the main body from moving with the grip. Further core, if the height adjustment lever is locked strongly, then the user must apply a strong force to the grip, but since the main body moves, then it may be difficult to release the lock. On the other hand, if the push button 34c is provided in the grip 32, as in the present embodiment, it is possible to push the push button 34c by the hand gripping the grip 32 while supporting the grip 32 with the hand, and therefore the body 12 itself is not liable to move. Consequently, even if the elastic force of the spring 40 biasing the lock member 34 is raised and the height adjustment lever 22 is locked strongly, a situation is not liable to occur where the body 12 moves and it is difficult to release the lock. According to the composition of the present embodiment, it is possible to manipulate the height adjustment lever 22 without supporting the body 12, or by just supporting the body 12 lightly.

Furthermore, if the user attempts to move the height adjustment lever 22 in a state where the height adjustment lever 22 is locked, then a strong force is applied to the first part 34f of the lock member 34 which is engaged with a cutaway section 54. Furthermore, if a strong force is applied to the front wheels 14 (for example, if the push mower 10 gets over a level difference, or the like), in a state where the height adjustment lever 22 is locked, then a strong force is also applied to the first part 34f of the lock member 34. In the push mower 10 according to the present embodiment, the second part 34g of the lock member 34, which is at the end side of the extending portion 34b from the first part 34f is inserted into the through hole 30c of the shaft 30. Therefore, if a strong force is applied to the first part 34f, the second part 34g contacts the inner surface of the through hole 30c of the shaft 30, and the second part 34g is supported by the inner surface of the through hole 30c. In other words, when a strong force is applied, the base side of the extending portion 34b of the lock member 34 is supported by the base portion 34a, and the end side of the extending portion 34b is supported by the shaft 30. Consequently, since the end side and the base side of the extending portion 34b are supported, the extending portion 34b is not liable to break even if a strong force is applied to the first part 34f.

The push mower 10 according to the present embodiment is composed in a manner that the second part 34g makes contact with and is supported by the shaft 30, only when a strong force is applied to the first part 34f. However, the second part 34g may also be supported by the shaft 30 at all times, in a manner which does not impede the movement of the lock member 34.

Furthermore, in the push mower 10 according to the present embodiment, the lock member 34 slides by the groove 34d formed in the lock member 34 being guided by the rail 32c formed in the inner surface of the grip 32. Consequently, it is possible to slide the lock member 34 smoothly. It is also possible to form a groove in the inner surface of the grip and to form a rail engaging that groove in the lock member.

Furthermore, in the push mower 10 according to the present embodiment, the push button 34c is positioned on the left side of the grip 32 when the push mower 10 is viewed from the front. In this case, a right-handed user can manipulate the height adjustment lever 22 easily from the front side. On the other hand, if the height adjustment lever 22 is to be manipulated from the handle 18 side, then the push button 34c should be positioned on the right side viewed from the front. Consequently, it is also possible to compose the height adjustment lever 22 so that the fitting orientation can be changed.

What is claimed is:

1. A push mower comprising:
    a main body configured to move along a ground, the main body defining a slit that includes a slit portion and a plurality of cutaway portions;
    a blade attached to the main body;
    a height adjustment lever; and
    a height adjustment mechanism configured to change a height of the blade from the ground based on a position of the height adjustment lever, wherein
    the height adjustment lever comprises:
        a shaft extending through the slit, and attached to the height adjustment mechanism;
        a grip fixed to the shaft and having a longitudinal orientation that is perpendicular to an extending orientation of the shaft; and
        a lock member accommodated inside the grip, the lock member including:
            a base portion within the grip that extends from an approximate center of the grip towards an opening in the grip,
            a push button that is formed on the base portion and protrudes to an outside of the grip through the opening in the grip, and
            an extending portion that extends from the base portion to an outside of the grip into the main body, the extending portion further includes an engaging part, and the engaging part faces the slit; wherein
        the height adjustment lever is configured to be unmovable when the lock member is at a lock position and be movable when the lock member is at an unlock position, and
        when the push button is pushed, the lock member is configured to move in a direction perpendicular to the extending orientation of the shaft with respect to the grip from the lock position to the unlock position, and the engaging part moves out of one of the plurality of cutaway portions and into the slit portion such that the shaft of the height adjustment lever is movable along the slit portion.

2. The push mower of claim 1, wherein the engaging part of the extending portion engages with the main body when the lock member is at the lock position.

3. The push mower of claim 2, wherein
    the extending portion further includes a supported part, which is at an end side of the extending portion from the engaging part, and is supported by the shaft when the height adjustment lever is manipulated in a state in which the lock member is at the lock position.

4. The push mower of claim 2, wherein
    the extending portion further includes a supported part which is at an end side of the extending portion from the engaging part,
    a through hole is formed on the shaft, and
    the supported part of the extending portion is in the through hole when the lock member is at the lock position.

5. The push mower of claim 4, wherein the through hole opens to a direction perpendicular to a direction of the movement of the height adjustment lever.

6. The push mower of claim 5, further comprising a spring biasing the lock member to the lock position.

7. The push mower of claim 1, further comprising a spring biasing the lock member to the lock position.

* * * * *